J. McQUEAD.
Wagon-Brake.
No. 52,731.
Patented Feb 20. 1866
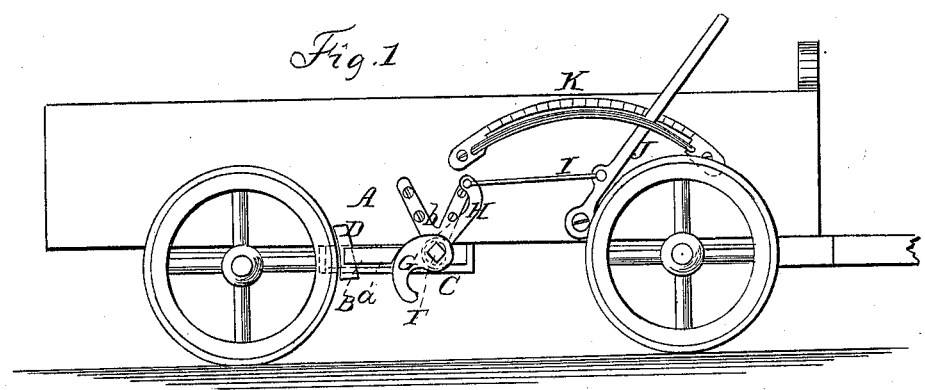
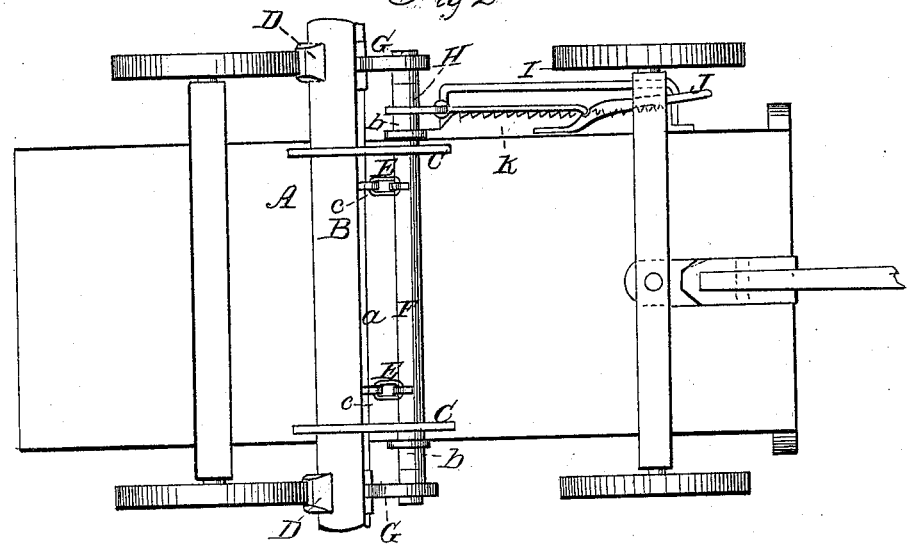
Witnesses.
Inventor.

UNITED STATES PATENT OFFICE.

JOSEPH McQUEAD, OF MOUNT STERLING, ILLINOIS.

IMPROVEMENT IN WAGON-BRAKES.

Specification forming part of Letters Patent No. 52,731, dated February 20, 1866.

*To all whom it may concern:*

Be it known that I, JOSEPH McQUEAD, of Mount Sterling, Brown county, State of Illinois, have invented a new and Improved Wagon-Brake; and I do hereby declare that the following is a full, clear, and exact description thereof, which will enable others skilled in the art to make and use the same, reference being had to the accompanying drawings, forming part of this specification, in which—

Figure 1 is a side view of my invention applied to a wagon; Fig. 2, an inverted plan of the same.

Similar letters of reference indicate like parts.

This invention relates to a new and improved brake for wagons and other wheel-vehicles; and it consists in the employment or use of a sliding brake-bar connected with a shaft having eccentrics attached to operate against the brake-bar, all arranged and applied in such a manner as to admit of being operated with the greatest facility by the driver.

A represents a wagon, which may be constructed in the usual manner, and B is a sliding bar, which is fitted in guides C C attached to the under side of the wagon-body.

To each end of the bar B a shoe, D, is attached, said shoes being in line with the rear wheels of the wagon, and the front side or edge of the bar B is beveled or inclined, as shown at *a*.

The shoe or brake bar is connected by links E E with a shaft, F, which is fitted in proper bearings *b b*, and is parallel with the bar B, and the eyebolts *c*, which connect the links E with the bar B, may, if desired, pass entirely through the bar and have nuts on their outer ends, in order to adjust bar B nearer to or farther from the shaft E, as may be desired.

On the shaft E there are secured two eccentrics, G G, the form of which is shown clearly in Fig. 1, and on said shaft, near one end, there is fitted an arm, H, which is connected by a rod, I, with a lever, J, the latter being attached to one side of the wagon-body and secured at any desired point within the scope of its movement by a segment-rack, K, attached to the side of the wagon-body.

By shoving the lever J forward the shaft F will be turned in such a direction as to cause the eccentrics G G to bear against the front beveled edge of the bar B and shove the latter backward and press the shoes D D against the rear wheels. By drawing the lever J backward the links E E will draw the bar B forward and relieve the wheels of the shoes, the lever being retained in either a forward or backward position by the segment-rack, as previously stated.

This brake may be applied to a wagon at a small cost, and is preferable to the "self-acting brakes," commonly so termed, as it may be operated or applied, at the will of the driver, either in descending eminences or on level ground.

Having thus described my invention, I claim as new and desire to secure by Letters Patent—

The sliding brake or shoe bar B, connected to the shaft F by links E, or their equivalents, in combination with the eccentrics G G on said shaft and the lever J, connected with the shaft, and all arranged and applied to operate substantially as and for the purpose herein set forth.

The above specification of my invention signed by me this 15th day of December, A. D. 1865.

JOSEPH McQUEAD.

Witnesses:
 NELSON LOVETT,
 G. C. ROBINSON.